Patented Feb. 5, 1952

2,584,662

UNITED STATES PATENT OFFICE 2,584,662

CONCENTRATION OF VITAMIN A ESTERS

James G. Baxter and Henry M. Kascher, Rochester, N. Y., assignors, by mesne assignments, to Eastman Kodak Company, Rochester, N. Y., a corporation of New Jersey No Drawing. Application March 24, 1949, Serial No. 83,298

4 Claims. (Cl. 167—81)

This invention relates to improved procedure for the concentration of vitamin A esters, and is particularly concerned with the separtion of vitamin A esters from glycerides and thereby effecting concentration of the vitamin A esters.

It is an object of the invention to provide improved procedure for concentrating vitamin A esters. It is a further object of the invention to provide a method of separating ester mixtures comprising vitamin A esters and glyceride esters whereby the vitamin A esters are recovered substantially free of glyceride esters. Another object of the invention is to provide a method of concentrating vitamin A esters without substantial decomposition. Another object is to provide a method of concentrating vitamin A esters on a commercial scale. Other objects will be apparent from the description and claims which follow.

These and other objects of the invention are attained by means of this invention wherein an oil comprising an admixture of vitamin A esters and glycerides is dissolved in a non-polar solvent, the resulting solution is contacted with a mild, substantially neutral, non-acidic adsorbent having the property of adsorbing substantially all of the glyceride to the substantial exclusion of the ester, drawing off the unadsorbed portion of the original solution, and evaporating the solvent from the unadsorbed portion of the initial solution to recover a vitamin A ester concentrate substantially free of glyceride and of substantially greater vitamin A potency than the original oil and containing a major proportion of the vitamin A ester from the oil.

The process of this invention is advantageously utilized in conjunction with high vacuum, unobstructed path distillation whereby an oil containing vitamin A esters in dilute form in glycerides, such as a fish oil, is partially concentrated by high-vacuum distillation. For example, menhaden oil contains vitamin A esters in a low concentration of about 100 units per gram. Concentration of such dilute oils by high-vacuum distillation would require repeated distillation with its attendant thermal decomposition. Such oils can be partially concentrated by one vacuum distillation and the concentration carried to the final desired degree by means of this invention. In this way a better product of higher concentration is obtained with substantially less loss of vitaman A. The invention is not limited to such low-potency oils, however, but is equally applicable to such higher potency oils as pollack and shark liver oils.

The oil being treated in accordance with this invention is first dissolved in a non-polar solvent which has weak eluting power. Such solvents include petroleum ether, petroleum naphtha, other lower or higher boiling petroleum fractions, hexane, cyclohexane, and less preferably carbon tetrachloride and ethyl benzene. The solvent employed must be non-polar in order for separation of the glycerides and the vitamin A esters to be effected since the concentration of the vitamin A esters depends upon the removal of the glycerides which otherwise act as diluent for the vitamin A ester.

The adsorbent employed in accordance with this invention is a mild adsorbent, that is, an adsorbent of low activity. The adsorbent is also neutral or basic, i. e. substantially non-acidic. The adsorbents which are particularly suitable are the synthetic zeolites or sodium aluminum silicate adsorbents, although other mild, substantially neutral, non-acidic adsorbents may be used such as the natural zeolites, calcium hydroxide, zinc carbonate and the like. Activated or strong adsorbents are not suitable for practising this invention because they adsorb both the vitamin A esters and the glycerides and the vitamin A esters are not recovered in the original filtrate substantially free of glycerides. The adsorbent in every case is used in an amount sufficient to adsorb the desired percentage of the glycerides, usually 30–80% by weight of the oil treated, depending on the degree of concentration desired.

Use of solvents and adsorbent in accordance with this invention results in preferential adsorption of a substantial part of the glyceride with little or no adsorption of the vitamin A ester. Contact between the adsorbent and the oil is brought about in any desired manner. For instance, the adsorbent may be packed in a tube to form an adsorption column. The column is then preferably treated with solvent to displace air and the solution of oil in a non-polar solvent is passed therethrough. The glycerides are adsorbed by the adsorbent but substantially none of the vitamin A ester is adsorbed. A major proportion of the vitamin A esters, for example as much as 85% of the original vitamin A ester content, passes through the column and is recovered in the original filtrate. If it is desired to recover the remainder of the vitamin A ester which is merely occluded in the interstices in the column, this may be done by washing the column with the same or similar non-polar solvent which has insufficient eluting power to elute the adsorbed glycerides.

The original filtrate containing most of the vitamin A ester content of the original oil is then evaporated, preferably under vacuum, to remove the solvent and leave a residue constituting an improved vitamin A ester concentrate. If desired, the column may be washed as set forth hereinabove to recover residual occluded but unadsorbed vitamin A ester whereby substantially complete recovery of vitamin A ester is effected.

Another satisfactory method of contacting the adsorbent and oil solution is to add the adsorbent in granular or powder form to the solution. The mixture is then stirred and is permitted to stand until the glycerides are adsorbed, which requires only a few minutes. The mixture is then filtered and the vitamin A ester recovered from the filtrate.

Example 1

Two grams of a fish liver oil blend ($E_{1cm.}^{1\%}$ 328 $m\mu = 16.5$ vitamin A potency 33,000 units per gram) containing Mexican shark liver and Hake liver oil was dissolved in petroleum ether (25 cc.) and the solution was filtered through an adsorption column (30 cm $\times$ 2.4 cm.) filled with 50 g. of commercial sodium aluminum silicate. The column was washed with petroleum ether (150 cc.) and the filtrate was evaporated to yield a vitamin A ester concentrate having a vitamin A potency of 212,000 units per gram in a weight of product amounting to 0.266 grams as compared to two grams of oil originally being treated. It is thus evident that 85% of the vitamin A in the original fish liver oil had been concentrated from a potency of about 33,000 u./g. to a potency of 212,000 u./g. while glycerides amounting to about 87% of the original oil had been separated from the vitamin A ester.

Example 2

The nature of this invention becomes readily apparent when, as in Example 1, two grams of the fish liver oil are dissolved in 25 cc. of petroleum ether and passed through a column of synthetic sodium aluminum silicate ("Doucil"). In this case, the original filtrate obtained, without washing the column with additional petroleum ether, was evaporated to remove the original solvent. The vitamin A ester concentrate obtained thereby from the original filtrate contained 83.7% of the vitamin A ester originally present in the oil and the potency had been increased from about 33,000 units per gram to 194,200 units per gram without eluting the column at all. Furthermore, the vitamin A ester concentrate recovered from the original filtrate amounted to only about 13% of the weight of the oil treated from which it is apparent that glycerides amounting to nearly 87% of the weight of the oil were adsorbed and separated from the vitamin A esters.

When activated alumina was substituted for the zeolite in the column and the process repeated, the original filtrate contained no vitamin A ester; and, when the column was washed with petroleum ether, no vitamin A ester was obtained thereby. The activated alumina column was then eluted with a mixture of acetone and ethyl ether. These polar solvents eluted the adsorbed vitamin A ester but also eluted a large amount of adsorbed glycerides, for the resulting product, after evaporation of the solvent, contained 95% of the original vitamin A ester but in a potency of less than 40,000 units per gram and in admixture with more than 93% of the glyceride from the original oil. In the case of the treatment with activated alumina as well as treatment with synthetic zeolite, the taste and odor of the product obtained was much improved over the original oil. It is readily apparent, however, that while both adsorbents removed objectionable coloring and odoriferous materials, only the mild substantially neutral non-acidic adsorbent effected separation of the glycerides and the vitamin A esters.

This application is a continuation-in-part of our co-pending application Serial No. 555,407 filed September 22, 1944 now abandoned.

The invention has been described in considerable detail with reference to preferred embodiments thereof but it will be understood that variations and modifications may be effected within the spirit and scope of the invention as set forth herein and refined in the appended claims.

What we claim is:

1. The method of treating a vitamin A-bearing oil which comprises dissolving in petroleum ether an oil containing an admixture of a vitamin A ester and a glyceride, passing the resulting solution through a synthetic sodium aluminum silicate adsorbent column effective to adsorb from about 30% to about 80% of the weight of said oil in said solution, collecting the unadsorbed portion of said solution after passage through said column, and evaporating the solvent from said unadsorbed portion of said solution and thereby recovering a vitamin A ester concentrate of substantially greater vitamin A potency than the original oil and containing a major proportion of the vitamin A ester from said oil.

2. The method of treating a vitamin A-bearing oil which comprises dissolving in petroleum ether an oil containing an admixture of a vitamin A ester and a glyceride, contacting the resulting solution with a body of adsorbent effective to adsorb from about 30% to about 80% of the weight of said oil in said solution, said adsorbent being selected from the group of mild, substantially neutral, non-acidic adsorbents consisting of synthetic sodium aluminum silicate adsorbents and natural zeolite adsorbents, drawing off the unadsorbed portion of the initial solution, and evaporating the solvent from said unadsorbed portion of said initial solution and thereby recovering a vitamin A ester concentrate of substantially greater vitamin A potency than the original oil and containing a major proportion of the vitamin A ester from said oil.

3. The method of treating a vitamin A-bearing oil which comprises dissolving in petroleum ether an oil containing an admixture of a vitamin A ester and a glyceride, passing the resulting solution through a column of adsorbent effective to adsorb from about 30% to about 80% of said oil in said solution, said adsorbent being selected from the class of mild, substantially neutral, non-acidic adsorbents consisting of synthetic sodium aluminum silicate adsorbents and natural zeolite adsorbents, collecting the unadsorbed portion of said solution after passage through said column, said collecting including displacing the unadsorbed portion of said solution in said column by washing said column with additional petroleum ether and collecting the petroleum ether washings after passage through said column, evaporating said petroleum ether from said unadsorbed portion of said solution and thereby recovering a vitamin A ester concentrate of substantially greater vitamin A potency than the original oil and containing a major proportion of the vitamin A ester from said oil.

4. The method of filtering out glyceride from an oil containing an admixture of glyceride and vitamin A ester and recovering a major portion of the vitamin A ester in concentrated form, which method comprises dissolving an oil containing an admixture of glyceride and vitamin A ester in petroleum ether, filtering the resulting solution through a body of sodium aluminum silicate effective to retain from about 30% to about 80% of said oil in said solution, collecting the filtrate from said filtering, and evaporating the petroleum ether from said filtrate and thereby recovering a vitamin A ester concentrate of substantially greater vitamin A potency than the original oil and containing a major proportion of the vitamin A ester from said oil.

JAMES G. BAXTER.
HENRY M. KASCHER.

REFERENCES CITED

The following references are of record in the file of this patent:

UNITED STATES PATENTS

| Number | Name | Date |
|---|---|---|
| 2,136,453 | Merker | Nov. 15, 1938 |
| 2,306,776 | Buxton | Dec. 29, 1942 |

FOREIGN PATENTS

| Number | Country | Date |
|---|---|---|
| 541,003 | Great Britain | Nov. 10, 1941 |

OTHER REFERENCES

Reed, Industrial & Engineering Chemistry, Analytical Edition, volume 16, August 1944, pages 509, 510. (Copy in Division 59.)

Swain-Fisheries Research Board of Canada. Progress Reports of Pacific Stations. Number 49, September 1941, pages 13 to 16. (167–81 Box 5). (Copy in Division 43.)

Swain-Journal of Fisheries Research Board of Canada, volume 6, August 1943, pages 113 to 118. (Copy in Division 43.)